(12) United States Patent
Hisada et al.

(10) Patent No.: US 9,956,908 B2
(45) Date of Patent: May 1, 2018

(54) VEHICLE DISPLAY DEVICE

(71) Applicant: MAZDA MOTOR CORPORATION, Hiroshima (JP)

(72) Inventors: Seiji Hisada, Higashihiroshima (JP); Shigeyuki Sato, Aki-gun (JP); Yo Kitamura, Hiroshima (JP); Hado Morokawa, Hiroshima (JP); Hidehiko Soda, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days. days.

(21) Appl. No.: 14/989,844

(22) Filed: Jan. 7, 2016

(65) Prior Publication Data

US 2016/0207456 A1 Jul. 21, 2016

(30) Foreign Application Priority Data

Jan. 20, 2015 (JP) .................. 2015-008692

(51) Int. Cl.
*B60Q 1/00* (2006.01)
*B60Q 9/00* (2006.01)
*B60K 35/00* (2006.01)
*B60K 37/02* (2006.01)

(52) U.S. Cl.
CPC ............ *B60Q 9/00* (2013.01); *B60K 35/00* (2013.01); *B60K 37/02* (2013.01); *B60K 2350/1064* (2013.01); *B60K 2350/402* (2013.01)

(58) Field of Classification Search
CPC ...................................... B60Q 9/00
See application file for complete search history.

(56) References Cited

U.S. PATENT DOCUMENTS

| | | | | |
|---|---|---|---|---|
| 6,049,288 A * | 4/2000 | Kawasaki | ............ | B60K 37/00 248/27.1 |
| 6,333,697 B1 * | 12/2001 | Kumazawa | ............ | B60K 37/02 340/458 |
| 7,142,980 B1 * | 11/2006 | Laverick | ............ | G01C 21/26 701/491 |
| 9,463,694 B1 * | 10/2016 | Clark | ............ | B60K 37/02 |

(Continued)

FOREIGN PATENT DOCUMENTS

| DE | 348522 C | 2/1922 |
|---|---|---|
| DE | 10303278 A1 | 8/2004 |

(Continued)

OTHER PUBLICATIONS

An Office Action issued by the German Patent Office dated Mar. 28, 2017, which corresponds to German Patent Application No. 102016000449.5; with English language translation.

(Continued)

*Primary Examiner* — Erin M File
(74) *Attorney, Agent, or Firm* — Studebaker & Brackett PC (57) ABSTRACT

The present application discloses a vehicle display device including an image display device with a display surface on which images are displayed; and a ring member configured to surround a first region, which overlaps the display surface, and a second region, which protrudes from the display surface. The image display device displays an indicator indicating a physical quantity along the ring member in the first region.

12 Claims, 10 Drawing Sheets

(56) References Cited

U.S. PATENT DOCUMENTS

| | | | | |
|---|---|---|---|---|
| 2001/0030435 A1* | 10/2001 | Burns | ............... | B60K 37/00 |
| | | | | 296/24.3 |
| 2008/0123322 A1* | 5/2008 | Tane | ............... | B60K 35/00 |
| | | | | 362/23.01 |
| 2009/0278677 A1 | 11/2009 | Arie et al. | | |
| 2011/0163867 A1 | 7/2011 | Arie et al. | | |
| 2011/0257869 A1* | 10/2011 | Kumar | ............... | B61L 3/006 |
| | | | | 701/103 |
| 2012/0236693 A1* | 9/2012 | Hiranuma | ............... | G04G 17/02 |
| | | | | 368/205 |
| 2014/0043156 A1* | 2/2014 | Howk, Jr. | ............... | B60Q 1/503 |
| | | | | 340/468 |
| 2014/0182508 A1* | 7/2014 | Oishi | ............... | B60K 37/02 |
| | | | | 116/62.3 |
| 2014/0240961 A1* | 8/2014 | Tsubaki | ............... | H05K 7/00 |
| | | | | 362/97.1 |
| 2016/0009176 A1* | 1/2016 | Cramer | ............... | B60K 35/00 |
| | | | | 340/441 |
| 2016/0104437 A1* | 4/2016 | Iwakawa | ............... | G02B 6/0011 |
| | | | | 345/690 |
| 2016/0142689 A1* | 5/2016 | Karikomi | ............... | G01D 11/28 |
| | | | | 348/745 |
| 2016/0189345 A1* | 6/2016 | Fujita | ............... | G09G 5/12 |
| | | | | 345/660 |
| 2016/0224222 A1* | 8/2016 | Mori | ............... | B60K 35/00 |

FOREIGN PATENT DOCUMENTS

| | | |
|---|---|---|
| DE | 102010032713 A1 | 2/2012 |
| JP | S62-016522 U1 | 1/1987 |
| JP | 2007-62516 A | 3/2007 |
| JP | 2012-194138 A | 10/2012 |
| JP | 2014-095602 A | 5/2014 |

OTHER PUBLICATIONS

JP Office Action dated Mar. 7, 2017 from corresponding JP Appl No. 2015-008692, with English translation, 6 pp.

* cited by examiner

VEHICLE DISPLAY DEVICE

TECHNICAL FIELD

The present invention relates to a vehicle display device.

BACKGROUND ART

A lot of analog meters with rotary needles are used to give a driver information indicating running conditions of a vehicle. In recent years, there have been attempts to replace an analog meter with an image display device configured to display running conditions of a vehicle as an image (c.f. JP 2014-95602 A). Unlike the analog meter, the image display device may give a driver a variety of information.

Many drivers want running conditions to be displayed in a large display region. Therefore, if an image display device is used instead of an analog meter, a large display surface is required for the image display device. In general, if a driver wants information or images to be displayed in a large display region, an expensive image display device is required since a size of a display surface directly affects a cost of the image display device.

Another problem which an image display device faces is that the image display device gives a driver flat visual impression. The flat visual impression may not be acceptable for drivers who are familiar with conventional analog meters.

SUMMARY OF INVENTION

An object of the present invention is to provide a vehicle display device configured to display information, the information display being likely to be acceptable for drivers under usage of an image display device having a small display area.

A vehicle display device according to one aspect of the present invention includes an image display device including a display surface on which images are displayed; and a ring member configured to surround a first region, which overlaps the display surface, and a second region, which protrudes from the display surface. The image display device displays an indicator indicating a physical quantity along the ring member in the first region.

The present invention may provide a vehicle display device configured to display information, the information display being likely to be acceptable for drivers under usage of an image display device having a small display area.

The objects, features and advantages of the vehicle display device will be more apparent from the detailed description and the accompanying drawings.

DESCRIPTION OF EMBODIMENTS

Various embodiments of a vehicle display device will be described with reference to the accompanying drawings.

First Embodiment

The present inventors et al. have found that if a member configured to define a substantially closed region overlaps a display surface of an image display device, a driver is likely to perceive the closed region protruding a display surface as a region in which images are displayed as well as an actual display surface. The present inventors et al. have developed a vehicle display device having a design likely to be acceptable to drivers who are familiar with analog meters due to visual illusion of the drivers. A vehicle display device including an image display device having a display surface, on which images are displayed, and a ring member, which overlaps the display surface, will be described in the first embodiment.

Figure 1:
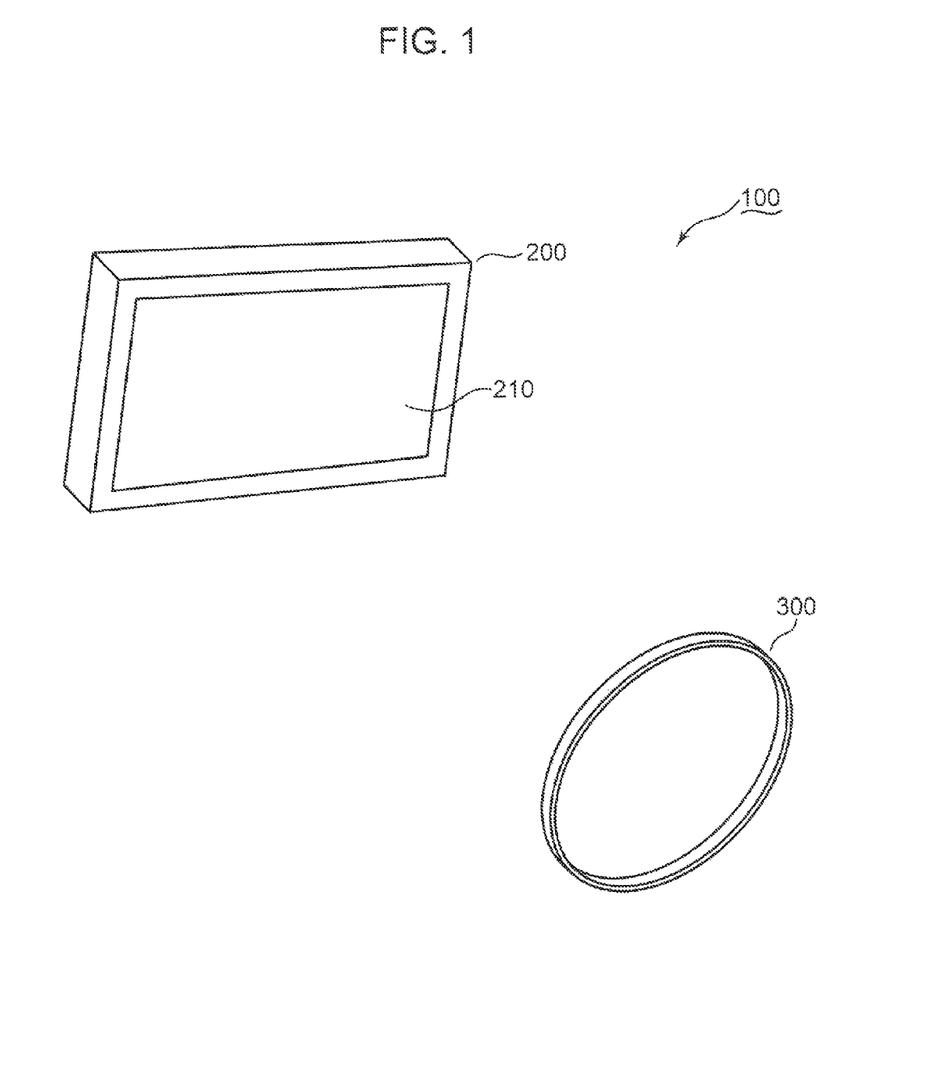
FIG. 1 is a schematic exploded perspective view of a vehicle display device according to the first embodiment.

FIG. 1 is a schematic exploded perspective view of a vehicle display device (hereinafter referred to as a display device 100). The display device 100 will be described with reference to FIG. 1.

The display device 100 includes an image display device 200 and a ring member 300. The image display device 200 includes a display surface 210. The image display device 200 displays images on the display surface 210 in response to image signals indicating information obtained from various sensors, which are mounted on a vehicle. The ring member 300 overlaps the display surface 210.

The image display device 200 may use liquid crystal to display images. Alternatively, the image display device 200 may display images on the basis of other image display techniques. The principle of the present embodiment is not limited to a specific image display technique used by the image display device 200.

In the present embodiment, the ring member 300 is circular. Alternatively, the ring member may be elliptical. Still alternatively, the ring member may be polygonal. The principle of the present embodiment is not limited to a specific shape of the ring member.

In the present embodiment, the ring member 300 defines a completely closed space. Alternatively, the ring member may be partially opened. The principle of the present invention is not limited at all by whether the ring member defines a completely closed space or not.

Figure 2A:
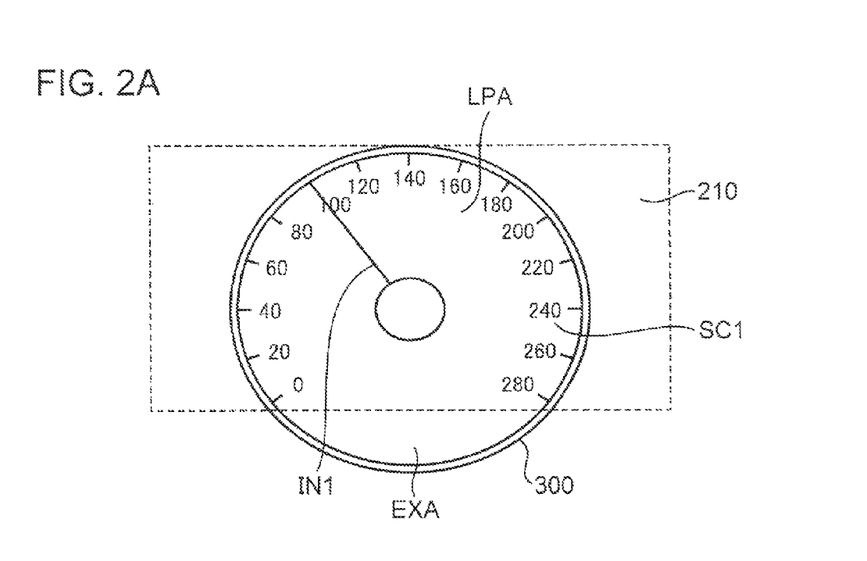
FIG. 2A is a conceptual view showing a positional relationship between a display surface and a ring member.
Figure 2B:
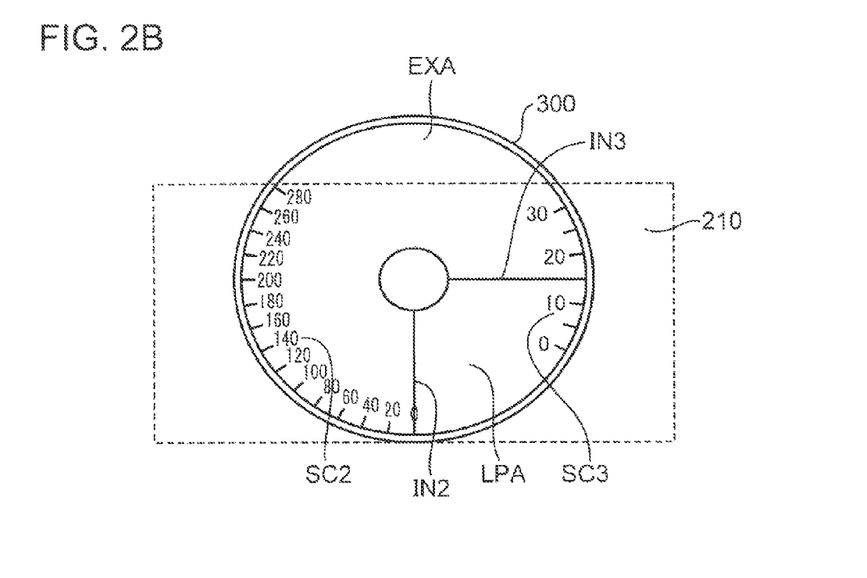
FIG. 2B is a conceptual view showing another positional relationship between the display surface and the ring member.
Figure 2C:
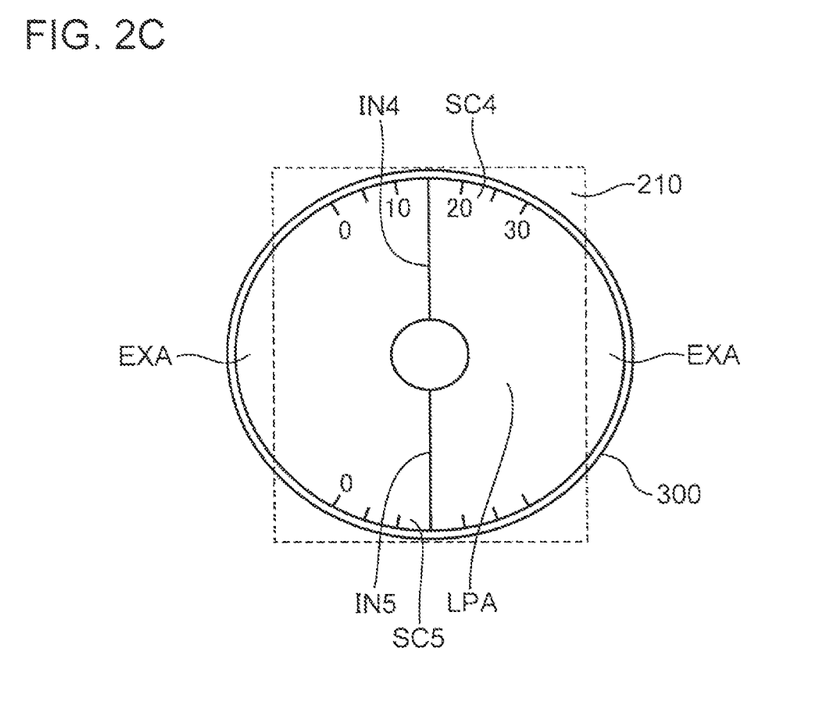
FIG. 2C is a conceptual view showing yet another positional relationship between the display surface and the ring member.

FIGS. 2A to 2C are conceptual views showing various positional relationships between the display surface 210 and the ring member 300. The various positional relationships between the display surface 210 and the ring member 300 will be described with reference to FIGS. 1 to 2C.

Each of FIGS. 2A to 2C shows the display surface 210 by dot lines. As shown in FIGS. 2A to 2C, a part of the circular closed space defined by the ring member 300 overlaps the display surface 210. Each of FIGS. 2A to 2C uses the symbol "LPA" to indicate a region in which the display surface 210 overlaps the circular closed space defined by the ring member 300. In the present embodiment, the first region is exemplified by the region LPA.

As shown in FIGS. 2A to 2C, the other portion of the circular closed space defined by the ring member 300 protrudes from the display surface 210. Each of FIGS. 2A to 2C uses the symbol "EXA" to show the region protruding from the display surface 210. FIG. 2A shows the region EXA defined below the region LPA. FIG. 2B shows the region EXA defined above the region LPA. FIG. 2C shows two regions EXA defined on the left and right sides of the region LPA. In the present embodiment, the second region is exemplified by one or a plurality of the regions EXA.

As shown in FIGS. 2A to 2C, there may be various positional relationships between the regions EXA, LPA. The principle of the present embodiment is not limited to a specific overlap pattern of the ring member 300 with the display surface 210.

As shown in FIG. 2A, the image display device 200 may display one indicator SC1 indicating a physical quantity in the region LPA along an inner edge of the ring member 300. As shown in FIG. 2B, the image display device 200 may display two indicators SC2, SC3 indicating physical quantities in the region LPA along the left and right edges of the ring member 300. As shown in FIG. 2C, the image display device 200 may display two indicators SC4, SC5 indicating physical quantities in the region LPA along the upper and lower edges of the ring member 300. The principle of the present embodiment is not limited to a specific number of indicators displayed in the region LPA.

Since the indicators SC1, SC2, SC3, SC4, SC5 are displayed along the inner edge of the ring member 300, the driver is likely to perceive the region EXA as a part of a region in which images are displayed although the region EXA protrudes from the display surface 210. Therefore, the driver is likely to perceive that the image display device 200 has a large image display region.

As shown in FIGS. 2A to 2C, the indicators SC1, SC2, SC3, SC4, SC5 may be displayed at various positions near the ring member 300. Therefore, the principle of the present embodiment is not limited to a specific display position of the indicators SC1, SC2, SC3, SC4, SC5.

In the present embodiment, scales and the numbers displayed in association with the scales are shown as the indicators SC1, SC2, SC3, SC4, SC5. Alternatively, physical quantities may be represented by another display format. The principle of the present embodiment is not limited to a specific display format of the indicators SC1, SC2, SC3, SC4, SC5.

The indicators SC1, SC2, SC3, SC4, SC5 may represent various physical quantities (e.g. a vehicle velocity, a revolutions per minute of an engine, a residual fuel amount and a water temperature) indicating running conditions of a vehicle. The principle of the present embodiment is not limited to specific physical quantities represented by the indicators SC1, SC2, SC3, SC4, SC5.

As shown in FIGS. 2A to 2C, the image display device 200 displays needle images IN1, IN2, IN3, IN4, IN5 which extend substantially from the center of a region surrounded by the ring member 300 toward the indicators SC1, SC2, SC3, SC4, SC5. Angles of the needle images IN1, IN2, IN3, IN4, IN5 may change in response to running conditions of a vehicle. A driver may watch the needle images to understand the running conditions of the vehicle.

Second Embodiment

A designer may design various vehicle display devices on the basis of the design principles described in the context of the first embodiment. For example, the designer may incorporate an analog meter into the vehicle display device in addition to the image display device. An exemplificative vehicle display device including an image display device and an analog meter will be described in the second embodiment.

Figure 3:
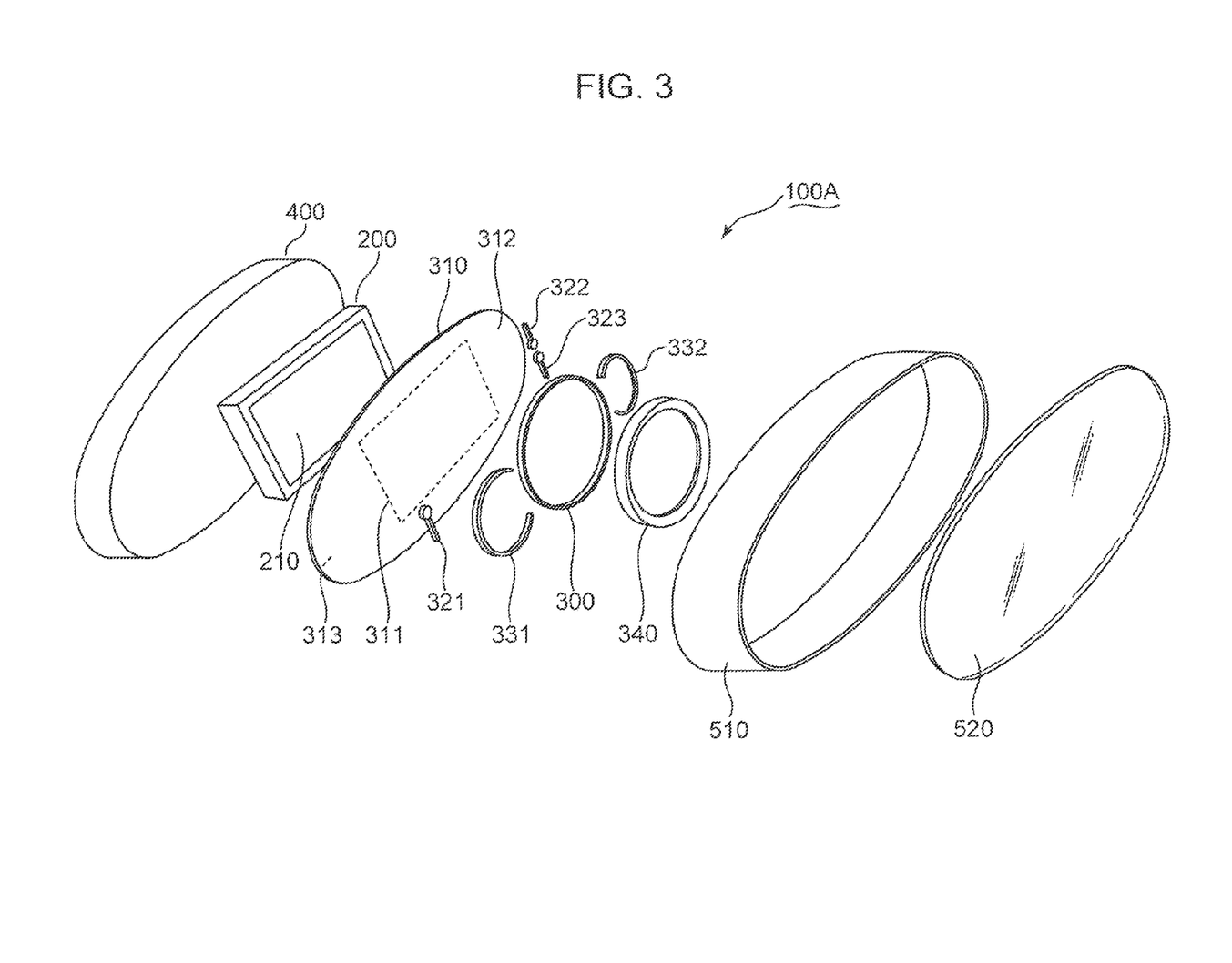
FIG. 3 is a schematic exploded perspective view of a vehicle display device according to the second embodiment.

FIG. 3 is a schematic exploded perspective view of a vehicle display device (hereinafter referred to as a display device 100A). Reference numerals used in common between the first and second embodiments mean that components denoted by the same reference numerals have the same functions as the first embodiment. Therefore, the description of the first embodiment is applied to these components. The display device 100A will be described with reference to FIGS. 2A to 3.

Like the first embodiment, the display device 100A includes the image display device 200 and the ring member 300. The description of the first embodiment is applied to these components.

The display device 100A further includes a driving unit 400, a display board 310, three needle members 321, 322, 323, two C-rings 331, 332, a light transmissive ring 340, a meter bezel 510 and a protective plate 520.

The display board 310 is situated between the image display device 200 and the ring member 300. A rectangular frame 311 is drawn on the display board 310. The display board 310 is aligned with the image display device 200 so that the rectangular frame 311 overlaps the outline of the display surface 210 of the image display device 200. Therefore, the line which draws the rectangular frame 311 may have a gradation pattern so that the line gradually becomes dense as the line departs from the display surface 210. Consequently, a driver is less likely to recognize a boundary between the display surface 210 and a region which surrounds the display surface 210.

The image display device 200 emits image light indicating the indicators SC1, SC2, SC3, SC4, SC5 described with reference to FIGS. 2A to 2C from the display surface 210. As described above, since the rectangular frame 311 overlaps the outline of the display surface 210 of the image display device 200, the image light reaches a region surrounded by the rectangular frame 311. The region inside the rectangular frame 311 allows light transmission. Therefore, the image light passes through the region inside the rectangular frame 311, and eventually reaches the eyes of a driver. Consequently, the driver may visually perceive the indicators SC1, SC2, SC3, SC4, SC5. In the present embodiment, the light transmissive board is exemplified by the display board 310.

The display board 310 includes a first surface 312 and a second surface 313. The first surface 312 faces the ring member 300. The second surface 313 faces the image display device 200.

The ring member 300 is fixed to the first surface 312 of the display board 310. The ring member 300 protrudes from the first surface 312 in a direction opposite to the image display device 200. A part of the region surrounded by the ring member 300 overlaps the region inside the rectangular frame 311. The other part of the region surrounded by the ring member 300 protrudes from the rectangular frame 311.

As described above, since the outline of the display surface 210 is blurred by the rectangular frame 311, a driver is likely to recognize the entire region surrounded by the ring member 300 as a region in which images are displayed.

Each of the needle members 321, 322, 323 is small pieces in rod shape. The needle members 321, 322, 323 are situated on the first surface 312 of the display board 310. The needle members 321, 322, 323 are mechanically connected to the driving unit 400. The needle members 321, 322, 323 are rotated on the first surface 312 by the driving unit 400.

Like the ring member 300, the C-rings 331, 332 are fixed to the first surface 312 of the display board 310. The ring member 300 is situated between the C-rings 331, 332.

The needle member 321 rotates in a region surrounded by the C-ring 331. A set of the C-ring 331 and the needle member 321 forms one analog meter. The needle members 322, 323 rotate in a region surrounded by the C-ring 332. The C-ring 332 and the needle members 322, 323 form another analog meter. Indicators (e.g. a scale or numbers) indicating running conditions of a vehicle may be drawn on the display board 310 along the C-rings 331, 332. A driver may visually perceive three meters arranged in the horizontal direction. In the present embodiment, the needle is exemplified by one of the needle members 321, 322, 323.

The light transmissive ring 340 is fixed to the first surface 312 of the display board 310 in the ring member 300. The light transmissive ring 340 forms a light transmissive band region along the inner edge of the ring member 300. The light transmissive ring 340 overlaps the indicators SC1, SC2, SC3, SC4, SC5 described with reference to FIGS. 2A to 2C. Therefore, a driver may visually perceive the indicators SC1, SC2, SC3, SC4, SC5 through the light transmissive band region formed by the light transmissive ring 340. Since the driver visually perceives the indicators SC1, SC2, SC3, SC4, SC5 through the light transmissive ring 340 which raises continuously from the display board 310 over the boundary outline of the display surface 210, the driver is less likely to recognize the presence of the boundary of the display surface 210.

The driving unit 400 may include a circuit (not shown) configured to generate image signals for driving the image display device 200. The image signals are output from the driving unit 400 to the image display device 200. The image display device 200 displays the indicators SC1, SC2, SC3, SC4, SC5 and the needle images IN1, IN2, IN3, IN4, IN5 in response to the image signals.

The driving unit 400 may include a driving motor (not shown) configured to drive the needle members 321, 322, 323. The driving unit 400 may include a light source configured to illuminate the indicators for the analog meters drawn on the display board 310. The driving unit 400 may include various electric circuits, driving devices and optical devices for operating the display device 100A. The principle of the present embodiment is not limited to a specific structure of the driving unit 400.

The meter bezel 510 is a cylindrical member defining a space in which the image display device 200, the ring member 300, the driving unit 400, the display board 310, the needle members 321, 322, 323, the C-rings 331, 332 and the light transmissive ring 340 are stored. The protective plate 520 closes an opening of the meter bezel 510. The image display device 200, the ring member 300, the display board 310, the needle members 321, 322, 323, the C-rings 331, 332 and the light transmissive ring 340 are situated between the driving unit 400 and the protective plate 520 inside the meter bezel 510.

The protective plate 520 is generally transparent. Therefore, image light generated by the image display device 200 reaches the protective plate 520 through the display board 310, and then the image light enters the eyes of a driver. Optical treatments may be applied to the protective plate 520 for suppressing reflection. In this case, the driver may satisfactorily visually perceive the indicators SC1, SC2, SC3, SC4, SC5 and the needle images IN1, IN2, IN3, IN4, IN5 displayed by the image display device 200 without disturbance of reflection on the protective plate 520.

Third Embodiment

A designer may design various vehicle display devices on the basis of the design principles described in the context of the second embodiment. For example, the designer may use an analog meter to make a boundary of the display surface less likely to be recognized by a driver. Techniques to make a boundary of the display surface less likely to be recognized by a driver will be described in the third embodiment.

Figure 4:
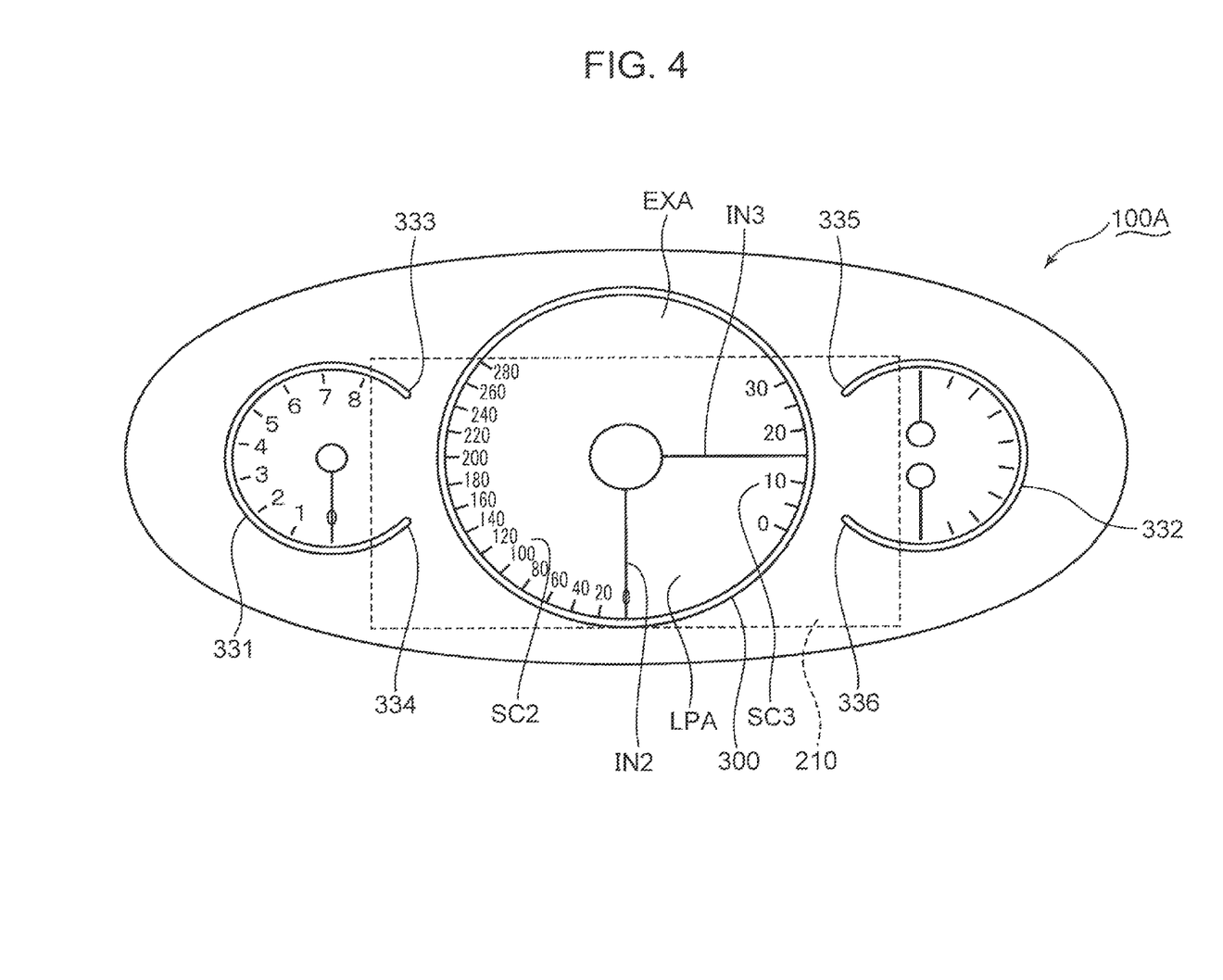
FIG. 4 is a schematic front view of a vehicle display device according to the third embodiment.

FIG. 4 is a schematic front view of the display device 100A. Reference numerals used in common between the second and third embodiments mean that components denoted by the same reference numerals have the same functions as the second embodiment. Therefore, the description of the second embodiment is applied to these components. The display device 100A will be described with reference to FIGS. 2B and 4.

As described with reference to FIG. 2B, the ring member 300 surrounds the region LPA, which overlaps the display surface 210, and the region EXA, which protrudes upward from the display surface 210.

The C-ring 331 situated on the left side of the ring member 300 includes an upper end 333 and a lower end 334. The lower end 334 is positioned below the upper end 333. The C-ring 331 extends toward the left side from the upper end 333 to the lower end 334 with drawing a crescent-shaped circular arc. The C-ring 331 is open between the upper and lower ends 333, 334. In short, the C-ring 331 is open toward the ring member 300. The upper and lower ends 333, 334 both overlap the display surface 210. Since a driver recognizes the region surrounded by the C-ring 331 as a part of the analog meter, the driver is less likely to recognize the presence of the left boundary of the display surface 210.

The C-ring 332 situated on the right side of the ring member 300 includes an upper end 335 and a lower end 336. The lower end 336 is situated below the upper end 335. The C-ring 332 extends toward the right side from the upper end 335 to the lower end 336 with drawing a crescent-shaped circular arc. The C-ring 332 is open between the upper and lower ends 335, 336. In short, the C-ring 332 is open toward the ring member 300. The upper and lower ends 335, 336 both overlap the display surface 210. Since a driver recognizes the region surrounded by the C-ring 332 as a part of the analog meter, the driver is less likely to recognize the presence of the right boundary of the display surface 210.

Fourth Embodiment

A designer may design various vehicle display devices on the basis of the design principles described in the context of the third embodiment. For example, the designer may use an image displayed by the image display device to make a boundary of the display surface less likely to be recognized by a driver. Techniques to make a boundary of the display surface less likely to be recognized by a driver will be described in the fourth embodiment.

Figure 5:
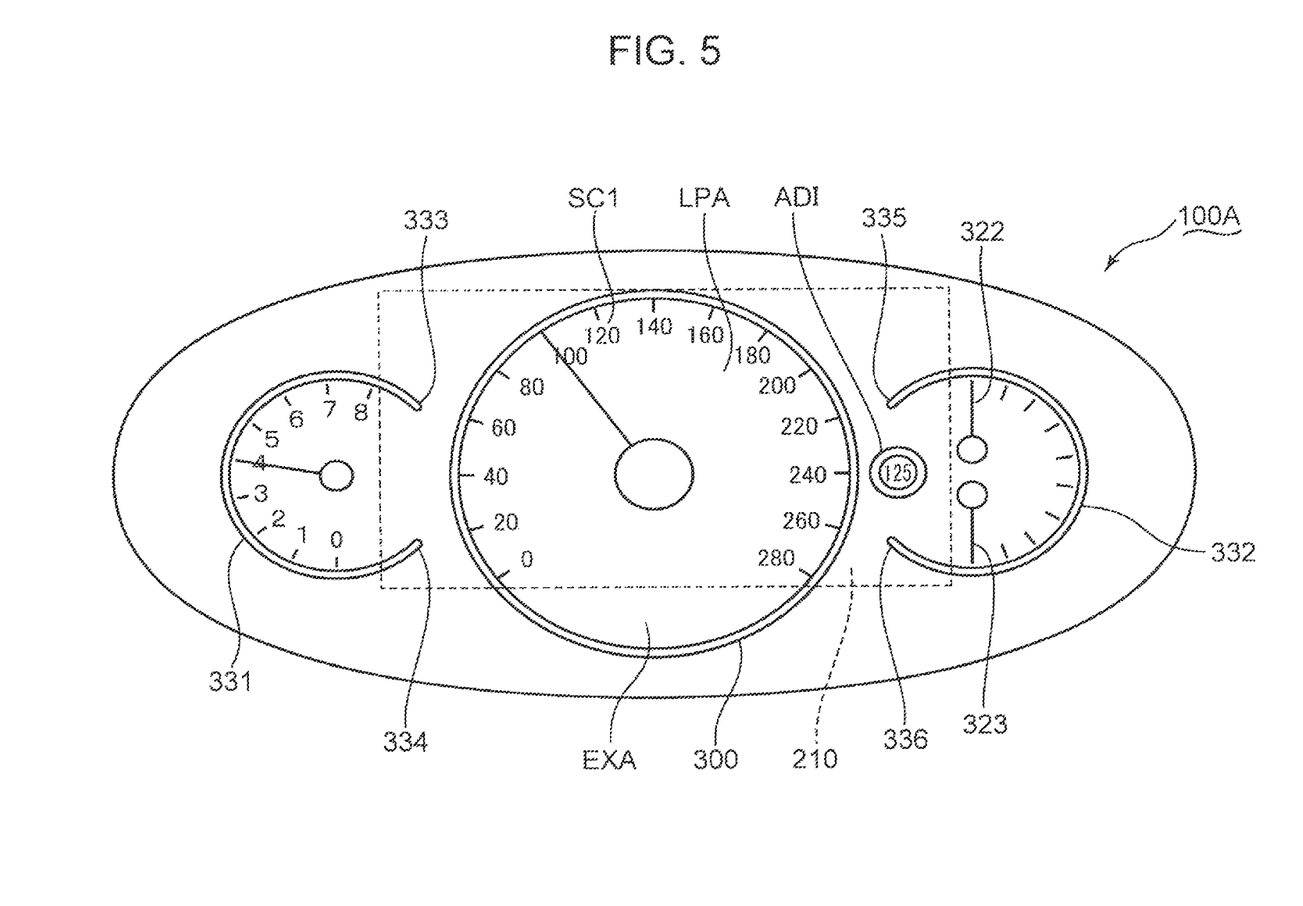
FIG. 5 is a schematic front view of a vehicle display device according to the fourth embodiment.

FIG. 5 is a schematic front view of the display device 100A. Reference numerals used in common between the third and fourth embodiments mean that components denoted by the same references numeral have the same functions as the third embodiment. Therefore, the description of the third embodiment is applied to these components. The display device 100A will be described with reference to FIGS. 2A, 3 and 5.

As described with reference to FIG. 2A, the ring member 300 surrounds the region LPA, which overlaps the display surface 210, and the region EXA, which protrudes downward from the display surface 210.

According to the design principle described in the context of the third embodiment, the upper and lower ends 333, 334 of the C-ring 331 overlap the display surface 210. Likewise, the upper and lower ends 335, 336 of the C-ring 332 overlap the display surface 210.

The image display device 200 (c.f. FIG. 3) may display another display image ADI (e.g. an image indicating a legal speed limit of a road on which a vehicle runs) in addition to the indicator SC1. The display image ADI is displayed at a position in correspondence to the opening between the upper and lower ends 335, 336. Accordingly, a driver may receive visual impression, in which a central meter formed by an image the image display device 200 displays and the ring member 300, is combined with the right analog meter formed by the C-ring 332 and the needle members 322, 323. Therefore, the driver is less likely to visually perceive the right boundary of the display surface 210.

Likewise, the image display device 200 may display an image between the upper and lower ends 333, 334 of the left C-ring 331. In this case, the driver may receive visual impression, in which a central meter formed by an image the image display device 200 displays and the ring member 300, is combined with the left analog meter formed by the C-ring 331 and the needle member 321. Therefore, the driver is less likely to visually perceive the left boundary of the display surface 210.

Fifth Embodiment

The C-ring described in the context of the third and fourth embodiments partially overlaps the display surface. Alternatively, the C-ring may be situated at a position away from the display surface. A vehicle display device having a C-ring situated at a position away from the display surface will be described in the fifth embodiment.

Figure 6:
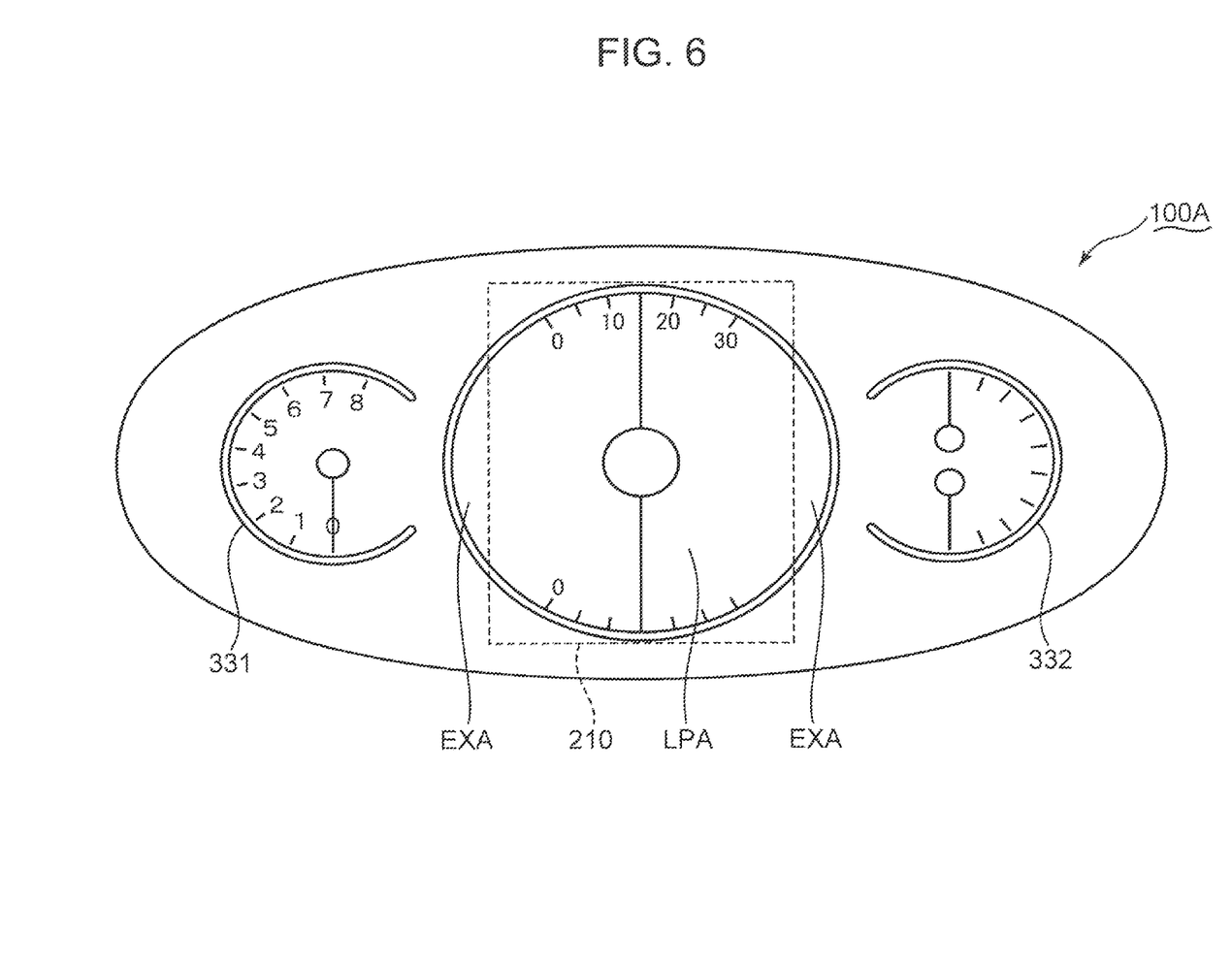
FIG. 6 is a schematic front view of a vehicle display device according to the fifth embodiment.

FIG. 6 is a schematic front view of the display device 100A. Reference numerals used in common between the second and fifth embodiments mean that components denoted by the same reference numerals have the same functions as the second embodiment. Therefore, the description of the second embodiment is applied to these components. The display device 100A will be described with reference to FIGS. 2C and 6.

As described with reference to FIG. 2C, the ring member 300 surrounds the region LPA, which overlaps the display surface 210, and two regions EXA, which protrude toward the left and right sides from the display surface 210.

Since the C-ring 331 is situated on the left side of the left region EXA, the C-ring 331 does not overlap the display surface 210. Since the C-ring 332 is situated on the right side of the right region EXA, the C-ring 332 does not overlap the display surface 210.

The design principle of the present embodiment allows usage of a very small image display region. Therefore, there is a large cost reduction for the display device 100A.

Sixth Embodiment

The vehicle display device described in the context of the second embodiment is driven by the driving unit. A designer may provide various structures for the driving unit. An exemplificative structure of the driving unit will be described in the sixth embodiment.

Figure 7:
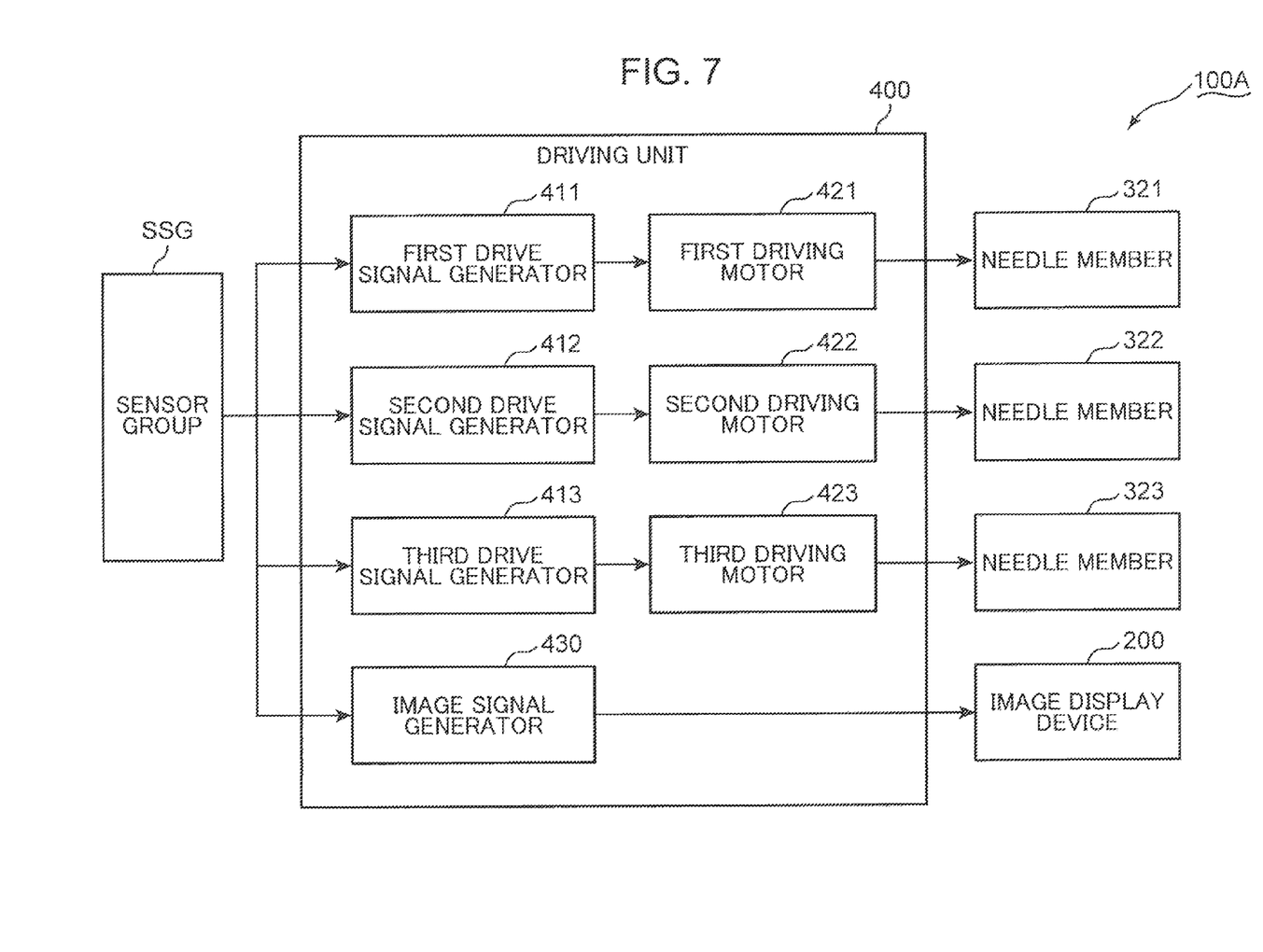
FIG. 7 is a block diagram schematically showing a signal flow in a vehicle display device according to the sixth embodiment.

FIG. 7 is a block diagram schematically showing a signal flow in the display device 100A. Reference numerals used in common between the second and sixth embodiments mean that components denoted by the same reference numerals have the same functions as the second embodiment. Therefore, the description of the second embodiment is applied to these components. The display device 100A will be described with reference to FIGS. 3 and 7.

The driving unit 400 includes a first drive signal generator 411, a second drive signal generator 412, a third drive signal generator 413, a first driving motor 421, a second driving motor 422, a third driving motor 423 and an image signal generator 430. The first drive signal generator 411 is electrically connected to the first driving motor 421. The first driving motor 421 is mechanically connected to the needle member 321. The second drive signal generator 412 is electrically connected to the second driving motor 422. The second driving motor 422 is mechanically connected to the needle member 322. The third drive signal generator 413 is electrically connected to the third driving motor 423. The third driving motor 423 is mechanically connected to the needle member 323. The image signal generator 430 is electrically connected to the image display device 200.

Various sensor devices (not shown) are situated in a vehicle to detect physical quantities which change in response to running conditions of the vehicle. A sensor group SSG includes these sensor devices. The sensor group SSG generates various detection signals indicating various physical quantities. These detection signals are output from the sensor group SSG to the first to third drive signal generators 411, 412, 413 and the image signal generator 430. The sensors which form the sensor group SSG may be sensors used in existing vehicles. Therefore, the principle of the present embodiment is not limited to a specific sensor of the sensor group SSG.

The first drive signal generator 411 receives a detection signal indicating a physical quantity in correspondence to the indicator indicated by the needle member 321. The first drive signal generator 411 generates a driving signal in response to the detection signal. The driving signal is output from the first drive signal generator 411 to the first driving motor 421. The first driving motor 421 rotates in response to the driving signal. Consequently, the needle member 321 may rotate on the display board 310.

The second drive signal generator 412 receives a detection signal indicating a physical quantity in correspondence to the indicator indicated by the needle member 322. The second drive signal generator 412 generates a driving signal in response to the detection signal. The driving signal is output from the second drive signal generator 412 to the second driving motor 422. The second driving motor 422 rotates in response to the driving signal. Consequently, the needle member 322 may rotate on the display board 310.

The third drive signal generator 413 receives a detection signal indicating a physical quantity in correspondence to the indicator indicated by the needle member 323. The third drive signal generator 413 generates a driving signal in response to the detection signal. The driving signal is output from the third drive signal generator 413 to the third driving motor 423. The third driving motor 423 rotates in response to the driving signal. Consequently, the needle member 323 may rotate on the display board 310.

The conversion from the detection signal to the driving signal may depend on various signal processing techniques used in existing analog meters. Therefore, the principle of the present embodiment is not limited to a specific signal processing technique for converting the detection signal to the driving signal.

The image signal generator 430 receives a detection signal indicating a physical quantity in correspondence to the indicator displayed by the image display device 200. The image signal generator 430 generates an image signal in response to the detection signal. The image signal is output from the image signal generator 430 to the image display device 200. The image display device 200 displays an image indicating an indicator or a needle on the display surface 210 in response to the image signal.

The signal processing technique for displaying images from the detection signal may depend on various existing image generation techniques. Therefore, the principle of the present embodiment is not limited to a specific signal processing technique for displaying images.

Seventh Embodiment

The vehicle display device described in the context of the first to sixth embodiments is attached to a dashboard of a vehicle. The dashboard typically includes a hood which protrudes so as to block external light entering from a window shield. If the vehicle display device is situated near the hood or if the hood protrudes too much, the hood may block a driver's sight line extending toward an image displayed by the vehicle display device. Techniques to allow a driver to visually perceive an image without disturbance of a hood will be described in the seventh embodiment.

Figure 8:
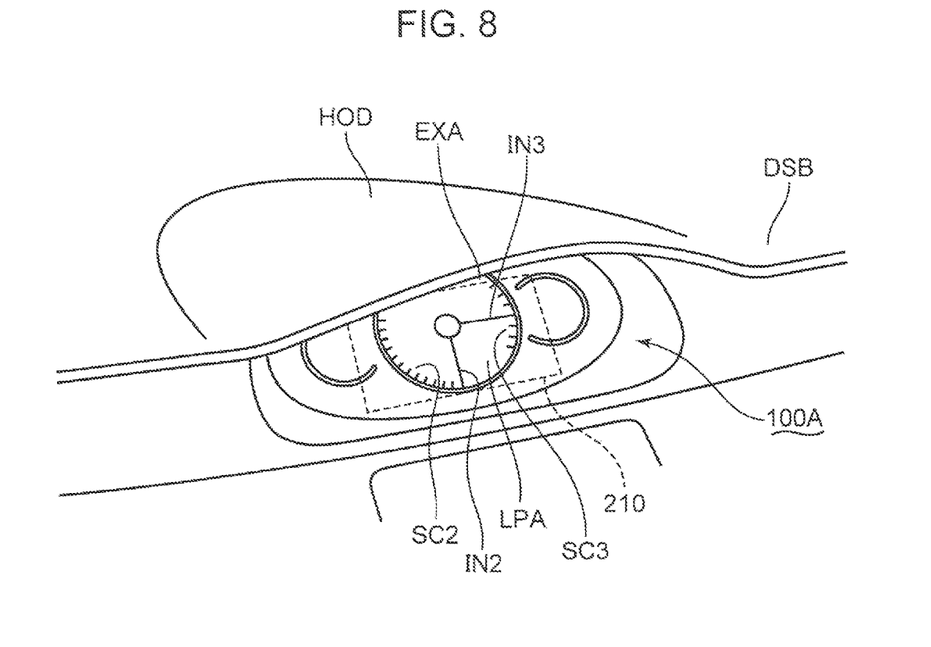
FIG. 8 is a schematic perspective view of a vehicle display device according to the seventh embodiment.

FIG. 8 is a schematic perspective view of the display device 100A described with reference to FIG. 4. Reference numerals used in common between the third and seventh embodiments mean that components denoted by the same reference numerals have the same functions as the third embodiment. Therefore, the description of the third embodiment is applied to these components. The display device 100A will be described with reference to FIGS. 4 and 8.

The display device 100A is attached to a dashboard DSB of a vehicle. The dashboard DSB includes a hood HOD which protrudes between a window shield (not shown) and the display device 100A. Since the hood HOD lies above the display surface 210, the hood HOD may substantially block external light passing from the window shield toward the display surface 210.

As described in the context of the third embodiment, the region EXA protruding from the display surface 210 is situated above the region LPA which overlaps the display surface 210. Since the region EXA is situated between the hood HOD and the region LPA, the region LPA is distant from the hood HOD. Therefore, a driver may visually perceive the indicators SC2, SC3 and the needle images IN2, IN3 displayed in the region LPA without the hood HOD blocking the line of sight.

Eighth Embodiment

The vehicle display device described in the context of the first to seventh embodiments forms one display unit. Alternatively, the vehicle display device may include a plurality of display units. A vehicle display device including a plurality of display units will be described in the eight embodiment.

Figure 9:
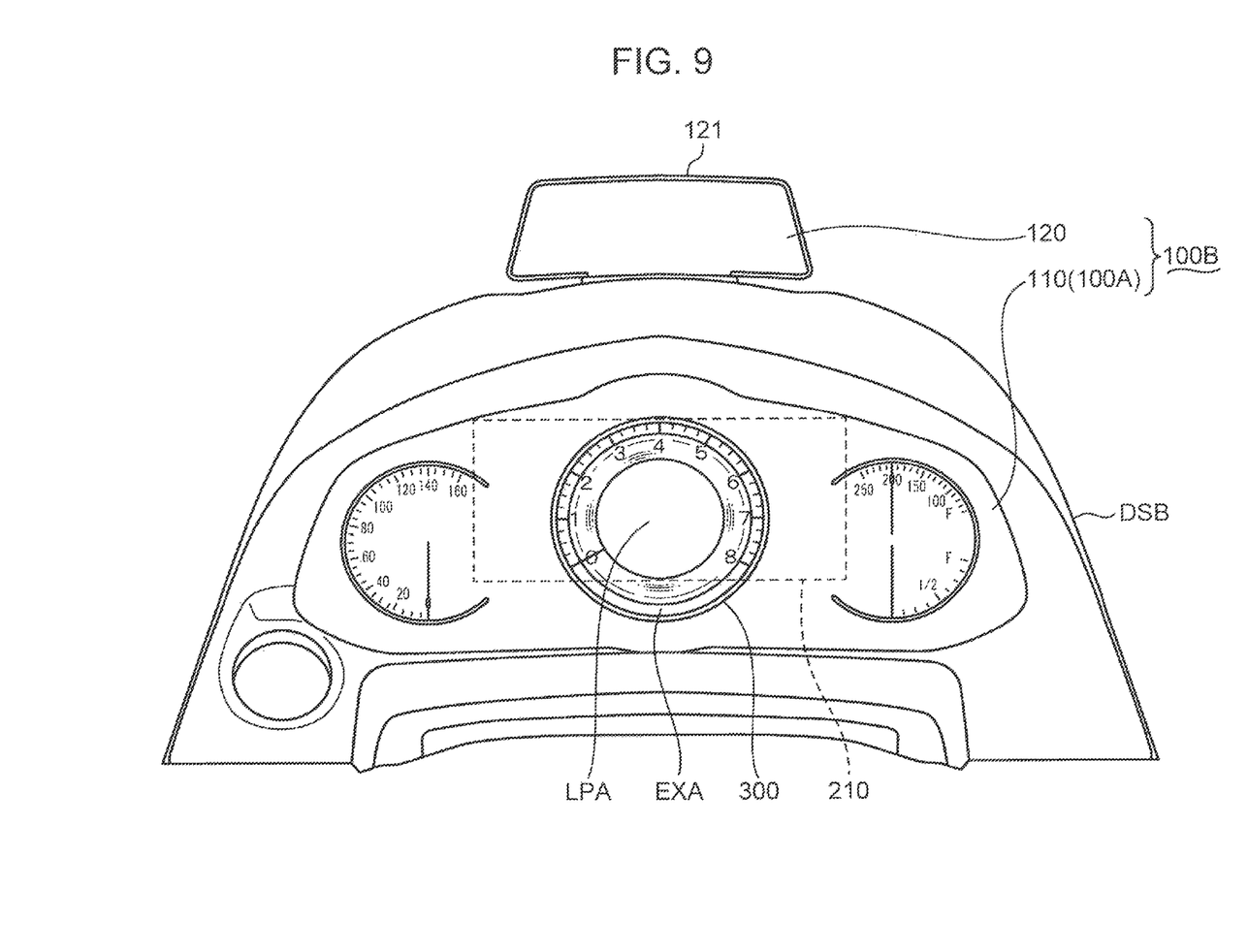
FIG. 9 is a schematic front view of a vehicle display device according to the eighth embodiment.

FIG. 9 is a schematic front view of a vehicle display device (hereinafter referred to as a display device 100B). Reference numerals used in common between the fourth and eighth embodiments mean that components denoted by the same reference numerals have the same functions as the fourth embodiment. Therefore, the description of the fourth embodiment is applied to these components. The display device 100B will be described with reference to FIG. 9.

The display device 100B includes a first display unit 110 and a second display unit 120. The first display unit 110 corresponds to the display device 100A (c.f. FIG. 5) described in the context of the fourth embodiment. Therefore, the description of the fourth embodiment is applied to the first display unit 110.

The first display unit 110 is attached to a front surface (a surface facing a driver) of the dashboard DSB. The second display unit 120 includes a display portion 121 which protrudes from the upper surface of the dashboard DSB. The display portion 121 is situated above the first display unit 110. In the present embodiment, a head-up display is used as the second display unit 120. A half mirror is used as the display portion 121. A projector (not shown) of the head-up display is stored in the dashboard DSB. Image light emitted by the projector reaches the eyes of the driver via the half mirror. Various existing structures may be used as the head-up display. The principle of the present embodiment is not limited to a specific structure of the head-up display.

In the present embodiment, an information display device is exemplified by the second display unit 120. Another display device (c.f. an optical device which blinks in order to warn a drive) may be used as the information display device instead of the head-up display.

The first display unit 110 uses a scale band extending in a crescent shape and a needle to display information such as a vehicle velocity, a revolutions per minute of an engine, a water temperature and a residual fuel amount. The second display unit 120 may display information on the display portion 121 in a different display format. For example, the display portion 121 may display a vehicle velocity in a digital expression (c.f. an expression of "100 km/h"). Alternatively, the second display unit 120 may display information different in contents (c.f. information indicating a selector position). The principle of the present embodiment is not limited to specific information displayed by the first and second display units 110, 120. In the present embodiment, information indicating running conditions of a vehicle is exemplified by information such as a vehicle velocity, revolutions per minute of an engine, a water temperature or a fuel or selector position.

As described in the context of the fourth embodiment, the region EXA protruding from the display surface 210 is situated below the region LPA which overlaps the display surface 210. Therefore, the region LPA is situated near the display portion 121. Accordingly, a driver may visually perceive information displayed in the region LPA and information displayed in the display portion 121 simultaneously. Alternatively, the driver may visually perceive information displayed in the region LPA and information displayed in the display portion 121 without moving the line of sight too much.

The principles of the aforementioned embodiments may be combined so as to be suitable for needs of vehicles.

The aforementioned embodiments mainly include a vehicle display device with the following features. The vehicle display device with the following features has a design which is likely to be acceptable to drivers who are familiar with analog meters.

A vehicle display device according to one aspect of the aforementioned embodiments includes an image display device including a display surface on which images are displayed; and a ring member configured to surround a first region, which overlaps the display surface, and a second region, which protrudes from the display surface. The image display device displays an indicator indicating a physical quantity along the ring member in the first region.

According to the aforementioned configuration, since the ring member surrounds not only the first region, which overlaps the display surface, but also the second region, which protrudes from the display surface, the driver may be likely to recognize the first and second regions as a region on which images are displayed. Therefore, the driver may be likely to recognize that the indicator indicating a physical quantity is projected on a large region. In addition, since the ring member gives the driver stereoscopic visual impression, the vehicle display device has a design that is likely to be acceptable to drivers who are familiar with analog meters.

With regard to the aforementioned configuration, the vehicle display device may further include an information display device which is situated above the image display device and displays information different from the indicator. The second region may be situated below the first region.

According to the aforementioned configuration, since the second region is situated below the first region, the indicator indicating a physical quantity is displayed near the information displayed by the information display device. Therefore, a driver may obtain some kinds of information without moving the line of sight too much.

With regard to the aforementioned configuration, information indicated by the indicator and information indicated by the information display device indicate a running condition of a vehicle.

According to the aforementioned configuration, since information indicated by the indicator and information indicated by the information display device indicate a running condition of a vehicle, a driver may obtain some kinds of information about a running condition of a vehicle without moving the line of sight too much.

With regard to the aforementioned configuration, the second region may be situated between the first region and a hood which protrudes over the display surface.

According to the aforementioned configuration, the hood makes external light less likely to interfere with image light indicating the indicator. In addition, since the second region is situated between the first region and the hood, the hood is less likely to cross the line of sight extending toward the indicator displayed on the first region. Therefore, a driver may easily visually perceive the indicator.

With regard to the aforementioned configuration, the vehicle display device may further include a light transmissive board situated between the ring member and the image display device; and an analog meter which includes a needle configured to rotate on the light transmissive board. The ring member may protrude from the light transmissive board in a direction opposite to the display surface.

According to the aforementioned configuration, since the ring member protrudes from the light transmissive board in a direction opposite to the display surface, the vehicle display device may give a driver stereoscopic visual impression.

The principles of the aforementioned embodiments are suitably used for designing various vehicles.

This application is based on Japanese Patent application No. 2015-8692 filed in Japan Patent Office on Jan. 20, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A vehicle display device comprising:
   an image display device including an image display surface on which images are displayed,
   a ring member having a height above the image display surface and having a first region overlapping the image display surface, and a second region of the ring member located outside of the image display surface, and
   a light transmissive board situated between the ring member and the image display device, the light transmissive board being larger than the image display device and the ring member, and
   wherein the image display device displays an indicator image and a needle image, the indicator image indicating a physical quantity along the ring member in the first region, and the needle image extends toward the ring member, and
   the second region is situated below the first region.

2. The vehicle display device according to claim 1, further comprising:
   an information display device which is situated above the image display device and displays information different from the indicator,
   wherein the second region is situated below the first region.

3. The vehicle display device according to claim 2, wherein information indicated by the indicator and information indicated by the information display device indicate a running condition of a vehicle.

4. The vehicle display device according to claim 1, wherein the second region is situated between the first region and a hood which protrudes over the display surface.

5. The vehicle display device according to claim 1, further comprising:
   an analog meter which includes a needle configured to rotate on the light transmissive board,
   wherein the ring member protrudes from the light transmissive board in a direction opposite to the image display surface.

6. A vehicle display device comprising:
   an image display device including an image display surface on which images are displayed,
   a light transmissive ring member having a height above the image display surface and having a first arcuate region overlapping the image display surface for transmission of light from the image display surface through the first arcuate region of the light transmissive ring member, and a second arcuate region of the light transmissive ring member located outside of the image display surface, and
   a light transmissive board situated between the ring member and the image display device, the light transmissive board being larger than the image display device and the ring member, wherein the image display device displays an indicator image and a needle image, the indicator image indicating a physical quantity along the light transmissive ring member in the first arcuate region, and the needle image extends toward the ring member.

7. The vehicle display device according to claim 6, further comprising:
an information display device which is situated above the image display device and displays information different from the indicator,
wherein the second arcuate region is situated below the first arcuate region.

8. The vehicle display device according to claim 7,
wherein information indicated by the indicator and information indicated by the information display device indicate a running condition of a vehicle.

9. The vehicle display device according to claim 6,
wherein the second arcuate region is situated between the first arcuate region and a hood which protrudes over the image display surface.

10. The vehicle display device according to claim 6, further comprising:
an analog meter which includes a needle configured to rotate on the light transmissive board,
wherein the light transmissive ring member protrudes from the light transmissive board in a direction opposite to the image display surface.

11. The vehicle display device according to claim 1, wherein the ring member is situated inside a meter bezel.

12. The vehicle display device according to claim 6, wherein the ring member is situated inside a meter bezel.

* * * * *